March 13, 1962     H. A. YOUNG     3,024,650
LOAD INDICATOR
Filed Aug. 24, 1959
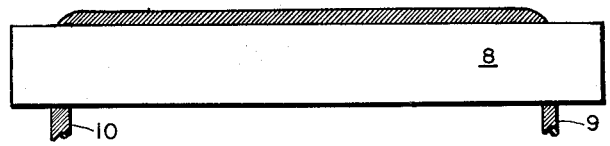
FIGURE 1
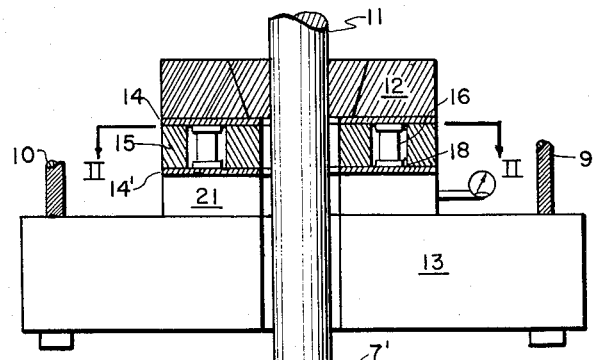
FIGURE 2
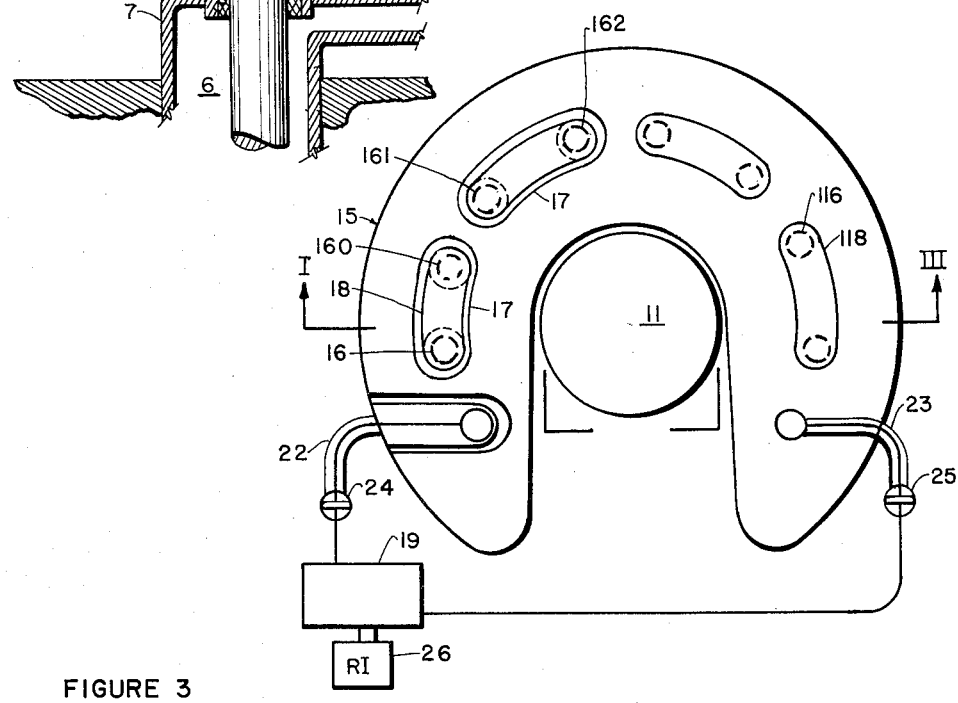
FIGURE 3
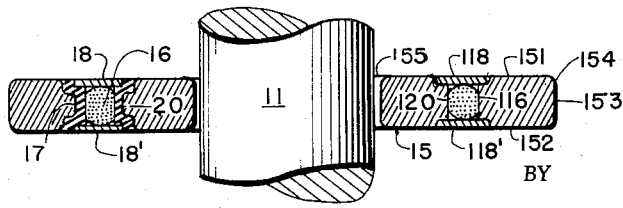
INVENTOR
H.A. YOUNG
Ely Silverman
BY
ATTORNEY

United States Patent Office 3,024,650
Patented Mar. 13, 1962

3,024,650
LOAD INDICATOR
Harold Arthur Young, Borger, Tex., assignor to J. M. Huber Corporation, Locust, N.J., a corporation of New Jersey
Filed Aug. 24, 1959, Ser. No. 835,679
3 Claims. (Cl. 73—141)

This invention relates to a new and novel weight-indicating and recording device. More particularly, this invention relates to a tester for use in connection with oil well pumping operations to indicate variations of the load supported by the reciprocating element of the well pump. In oil well pumping operations, it is important to determine the changes of load throughout the course of reciprocation of the pump elements. Such changes indicate not only the operating condition of the well but also the nature of certain important difficulties frequently experienced in such operations.

The load of reciprocating elements in an oil well is usually of great magnitude—of about 10,000 to 500,000 pounds. Devices capable of sustaining and measuring such heavy loads are generally extremely large, bulky and inaccurate. Several devices are known that attempt to provide the needed strength and accuracy, but these are subject to fatigue failure due to the lengthy periods of repeated stress applied thereto and/or mechanical failure due to dirt lodging between moving parts.

The present invention is based upon the discovery that the load-bearing element and the sensing element in a well-testing device may be largely separated and made of elastic members that minimize moving parts. Thereby the sensitivity of the sensing element is not required to be sacrificed to requirements of load bearing. Further, the load-bearing element may be made sufficiently sturdy without too much concern about the sensing ability thereof. Further still, according to my invention, there is a relation between the strength of the load-bearing element and the sensitivity of the sensing element whereby these two functionally different elements cooperate with each other and enable relatively inexpensive and sturdy elements to be used to produce reliable and accurate results.

An object of the present invention, therefore, is to disclose and provide a new and novel method of measuring repetitive stresses.

A further object of the present invention is to disclose and provide a new and novel method of measuring the variations in load in an oil well tester.

These and other objects, advantages, modifications, and adaptation of the invention will become apparent to those skilled in this art from the following detailed description. A specific embodiment of my invention is illustrated in the appended drawings, wherein:

FIGURE 1 is an over-all and cross-sectional view of the device of my invention mounted on a conventional hanger bar and as discussed hereinbelow; the cross-section is taken along the plane indicated as I—III in FIGURE 2;

FIGURE 2 is a plan view of resilient member 15, together with other parts associated therewith; this view is taken to show the structures seen in a view of plane II—II' of FIGURE 1 and a modification thereof; and FIGURE 3 is a cross-sectional view of the resilient member 15, and a modification thereof, as seen along plane I—III of FIGURE 2.

The construction of the device according to my invention is shown in FIGURE 1 in order to illustrate the application and functioning of the novel tester. An oil well comprising a bore 6 is surrounded by casing 7. The casing is provided with a stuffing box and packing 7' and a discharge outlet. A conventional pump (not shown) actuates the conventional reciprocating member or horse's head, 8, herein schematically shown. The member 8 supports reins 9 and 10 made, conventionally, of wire line cable. A rod string in the well 6 is attached by conventional means to a polish rod 11. The polish rod 11 is firmly supported by the conventional polish rod clamp 12. The weight of the rod string attached to polish rod 11 is transmitted via clamp 12 through the load indicator embodying my invention to a conventional hanger bar 13, which hanger bar is, in turn, supported by reins 9 and 10. The indicator comprises a resilient member 15, which bears the load applied to the clamp 12. Plastic insulating layers 14 and 14' electrically isolate the conductors 18 on the resilient unit 15. Sensing elements, as the transducers 16 in FIG. 1, are held in place within the exterior boundaries of the resilient member 15. These sensing elements 16 are electrically insulated as by insulating sleeves 17 from the load-bearing unit 15 when the member 15 is made of an electrically conductive material, such as steel. The sensing element is a resistance type transducer of the formula given in Table I below.

*Table I*

| Component: | Parts by weight |
|---|---|
| Smoked sheets (No. 1 grade) | 100 |
| Conductive black (Aromex CF) [1] | 50 |
| Zinc oxide | 5 |
| Sulfur | 2.75 |
| Stearic acid | 4 |
| Antioxidant (phenyl beta naphthylamine) | 1.5 |
| Accelerator (mercapto benzo thiazole disulfide) | .4 |

[1] Aromex CF is the trade name used for the J. M. Huber Corporation's conductive furnace black; this black has the following specifications and properties:

| | |
|---|---|
| Ash @ 550° C. (max.), percent | 1.0 |
| Fines+attrition—sieve No. 100, 20 minute Ro-Tap (max.), percent | 15 |
| Heating loss @ 105° C. (max.), percent | 1.5 |
| Pour density, lbs./cu. ft | 20–24 |
| Sieve residue—sieve No. 80 (max.), percent | .005 |
| Sieve residue—sieve No. 325 (max.), percent | .10 |
| Benzene extract, percent | .10 |
| Color—Nigrometer | 87 |
| Density @ 25° C., gms./ml | 1.80 |
| Discoloration of solvents: | |
| Benzene—transmittance, percent | 90 |
| Chloroform—transmittance, percent | 95 |
| Oil absorption, gms./100 gms | 101 |
| pH | 9.2 |
| Mean particle diameter, millimicrons | 26 |
| Surface area—B.E.T., sq. m./gm | 105 |
| Bleeding properties: Non-bleeding | |
| Staining properties: Slightly staining | |
| Volatile matter, percent | 1.5 |

A batch containing 300 grams of the smoked sheet in the composition of Table I above was mixed on a 6 inch diameter by 12 inch long laboratory mill (front roll speed of 28.42 feet per minute and front-to-back roll ratio of 1.0 to 1.40) as in procedure of A.S.T.M. method D–15–58T (1958 book of A.S.T.M. Standards, Part 9, Plastics, Electrical Insulation Rubber, Carbon Black published by American Society for Testing Materials, Philadelphia, Pa., 1958, pages 1225 ff.). Water at 100° F. was circulated through the mill rolls throughout the mixing time of 18 minutes. The resulting stock was aged 24 hours, passed six times through the mill at a tight mill setting (0.010 inch), then banded and sheeted off for a total remixing time of 5 minutes. Curing was at 274° F. for 60 minutes. The transducers were each made by conventional forming techniques with an outside diameter of ¼ inch and a total length of ½ inch, with ends slightly rounded (radius of curvature about 6 inches).

Ten of these transducers are arranged (together with insulating sleeves 17) generally as shown in FIGURE 2 and, more particularly, as shown in the left side of FIGURE 2. Sleeves 17 have about 1/16 inch wall thickness throughout and are made of flexible, electrically insulating rubber, although other nonconductive, flexible plastice could also be used. These sleeves are first placed in holes 20 in element 15 with a firm tight fit. The transducers fit into these sleeves with a press fit (±0.002 to ±0.003 inch). The steel resilient member 15 is 4¼ inches in diameter and ⅝ inch thick with smooth surfaces 151, 152, and 153, and rounded edges (as at 154 and 155, and adjacent elements 16 and holes 20) whereby stress concentration build-up is avoided. The transducers are connected in series by collectors 18 made of soft copper which are, preferably, silver coated and insulated from the electrically conductive resilient member 15 described below. The collecting plates 18 are 1/16 inch thick and about ⅜ inch wide in their center, with circularly rounded ends. Bars 18 on the top of each element 16 (and 160, 161, 162, etc.) and bars as 18' on the bottom of each such transducer provide for series connection of the transducers. (Bars 118 and 118' similarly serve elements 16, as discusssed below.) These bars are formed— as by slight punching prior to assembly—adjacent to the ends of the transducers to make a good electrical contact between said bars and the transducers.

When the load indicator of my invention takes the compressive stress of the weight of the rod string (or a comparable weight), the resilient element 15 is elastically compressed and, accordingly, the transducers are each subjected to compressive force from all sides by the compression of element 15. According to this invention, the resistivity of the transducing element is chosen with a range of resistivity-deformation characteristics related to the load applied to the hanger bar and the deformation and elasticity characteristics of the load-bearing unit, as 15. In this particular instance, with a 4.25 inch diameter of member 15 and a ⅝ inch thickness, using 1035 steel, with a compression strength of 85,000–92,000 and a proportional limit of above about 35,000–60,000 p.s.i. and modulus of elasticity of $30 \times 10^6$ (Young's modulus), it will be noted that the load of about 200,000 pounds to be carried is well within the proportional limit of the material of which element 15 is made, and the modulus of elasticity of such material of ⅝ inch thickness provides a change of dimension of the resistance type transducers 16 which produces a change of conductivity well within the operating range of the amplifying element, 19, and recorder, 26. A standardization of the device of my invention may be made on the well on which used by placing an accurate scale, 21, between members 13 and 14' (as shown in FIGURE 1); such a scale is shown in U.S. Patent 2,399,916. Accordingly, the resistivity of the totality of transducer elements at any given stress on the load indicator can be compared on the well with the particular stress indicated by the standard scale. A Bourdon gauge or other equally sensitive instrument may be used for such a standardization. However, the device of my invention does not suffer the fatigue damage to which such sensitive instruments are prone when used to repeatedly and continually measure the stresses in the polish road of an operating oil well. It will be noted that if there is not a linear relation or other such relation between the stress and change in resistivity as might be desired, one or more of the separate transducer blocks 160, 161, 162, etc. can be replaced by other transducers of different physical shape or electrical resistivity characteristics in order to provide the relation of stress and resistivity most desirable. However, in the preferred embodiment of my invention it will be noted that the sensing elements, 16, have ends that are slightly convex in section; this shaping provides the smootheast deformation-resistivity characteristics.

The material of which the transducers 16 are formed provides the sturdy and somewhat plastic mass that fits snugly into the holes 20. This resilient member may be made of a variety of materials, as detailed below, which may suffer repeated compression without fatigue thereof: those materials are used for which the product of the cross-sectional area of the element 15 to be used and the proportional limit of strength in compression on repeated loads substantially exceeds the total load to be applied thereto. It will be noted that the resilient member 15 has a much greater breadth (about 4¼ inches) than height (about ⅝ inch). Accordingly, the shocks and vibratory and oscillatory stresses to which such device is subject during use as an oil well load indicator do not affect the position or alignment of the support element 15 with respect to the hanger bar or clamp. Inasmuch as many oil well holes are irregular and a rod rotator may be imposed between the clamp 12 and the bar 13, usually immediately below the polish rod clamp, the ability of my device to withstand such shocks and torque as may be applied thereto then by a rod rotator makes the device of my invention a stable and reliable construction and of special use as an oil well load indicator. The material of which the transducer 16 is formed provides a sturdy and somewhat plastic mass that fits snugly into holes 20 of FIGURE 2. This resilient member 15 may, as above described, suffer repeated compression without fatigue thereof. The deformation suffered by the resilient member is predetermined by conventional engineering calculations to be within its proportional limit and to provide a substantial change in the resistance of the transducing element, such as from $350 \times 10^3$ to $200 \times 10^3$ ohms on application of the load to element 15, as in the below described embodiment. When the elasticity and strength characteristics of resilient member 15 and its dimension are chosen as above described, there is not sufficient force applied to the sensing elements 16 to cause fatigue or rupture thereof.

In an alternative embodiment of my invention, member 15 may be made of electrically nonconductive insulating material of high compressive strength such as "Teflon" (a trademark of Du Pont for polytetrafluoroethylene, grade 7) having a compressive strength of over 10,000 p.s.i. where the length of rod string and consequent weight on the polish rod permits material of such strength to be used as element 15 in this combination; polychlorotrifluoroethylene, with a compressive strength of above 30,000 p.s.i. is preferable for greater loads. Element 15 may also be made of synthetic rubber, such as Buna N or natural rubber having the desired compressive strength and proportional elastic limits and modulus of elasticity to produce, on application of the load to such element, the electrical characteristics in the transducer above described. As shown in FIGURES 2 and 3, wherein transducer elemets are shown (for such embodiments using electrically insulating material for element 15) as 116 and the collector element as 118, no sleeve (as 17 about elements 16, 160, 161, and 162) is necessary for each transducer as 116. However, the insulating plates 14 and 14' are still needed. In the embodiment of my invention using electrically insulating material for the load-bearing element 15, the holes 120 (in the element 15) may fit transducers, as 116, with the press fit above described, of ±.002 to ±.003 inch.

In the operation of this device, the transducing elements are connected to voltage supply and a conventional amplifier 19. The amplifier may be connected to a recording device 26 that shows a record of the stress versus time relations; thereby the stress carried by the sucker rod string and polish rod may be accurately and simply recorded, seen and studied. The record may be continuous or intermittent.

The wires 22 and 23 may be connected by disconnectible plugs 24 and 25 to the amplifier 19 where intermittent readings are satisfactory. The lines 22 and 23 may be connected along carrier bar 13, wire line cable 9 or 10 to plugs as 24 and 25 which plugs are attached to the Samson post of the oil well pump associated with member 8: thereby the amplifier and recording or indicating instrument may be conveniently electrically connected to elements 15. Such connection may be permanent or intermittent and the record may be made at that point by conventional recording equipment or transmitted for record and study elsewhere (as at a central point) as desired. Alternatively, the recording or indicating instrument may be placed on the horse's head so that the observer may more easily correlate the reading on the indicator with the position of the carrier bar in its pumping cycle.

The device according to my invention, therefore, allows an accurate inexpensive and sturdy method and apparatus for measuring the stress relations in a device that is repeatedly subjected to stresses that cause the usual devices for measuring such stresses to be rendered useless by fatigue failures, if not by dust and dirt interfering with the movement of mechanical parts.

When Lucite (methyl methacrylate) having a compressive strength of about 15,000 p.s.i. is used in the form and dimension of element 15 as above given, the change in current with the load is as given in Table II, wherein the changes in resistance were measured by a conventional volt ohmmeter, and the compressive load was applied by a conventional laboratory press.

*Table II*

| Load in pounds: | Resistance in thousands in ohms |
|---|---|
| 2,000 | 350 |
| 4,000 | 300 |
| 6,000 | 280 |
| 8,000 | 260 |
| 10,000 | 240 |
| 12,000 | 225 |
| 14,000 | 215 |

The insulating elements 14 and 14' were made of Lucite (Du Pont's trade name for polymerized methyl methacrylate), although other electrically insulating material such as non-conducting rubber could also be used. The insulation on wires 22 and 23 is conventional for the voltages and currents carried therein.

It is to be understood that the forms of my invention herewith shown and described are to be taken as preferred examples of the same and that various changes in the shape, size and arrangement of parts may be resorted to without departure from the spirit of my invention as expressed in the subjoined claims.

I claim:

1. A load indicator comprising a relatively flat member formed of elastic resilient material, said member having a plurality of apertures extending therethrough, a resistance type transducer disposed in each of said apertures, a plate engaging each end of each of said transducers with said plates extending oppositely into contact with the next adjacent transducer electrically connecting said transducers in series, said plates being relatively movable with respect to each other to transmit loads applied thereon to said transducers, said transducers being adapted to substantially and reproducibly change their electrical resistance when subjected to dimensional change due to compressive strain applied through said plates, said member absorbing practically all of the load applied to said load indicator with said transducers absorbing only a portion of said load sufficient to produce measurable resistance changes therein proportional to the load on said load indicator, and means connected to said transducers for measuring the change in electrical resistance therein.

2. A device as claimed in claim 1 wherein said transducers each comprise a solid block formed of rubber having a conductive carbon black uniformly dispersed therethrough.

3. A device as claimed in claim 2 wherein each of said solid blocks have the opposite ends thereof formed semispherical for engaging said plates.

References Cited in the file of this patent

UNITED STATES PATENTS

| 2,396,916 | Guthrie | Mar. 19, 1946 |
| 2,472,214 | Hurvitz | June 7, 1949 |
| 2,614,416 | Hollmann | Oct. 21, 1952 |